United States Patent
Sarén et al.

(10) Patent No.: US 8,228,698 B2
(45) Date of Patent: Jul. 24, 2012

(54) FREQUENCY CONVERTER VOLTAGE PULSE SHAPING DEVICE AND METHOD

(75) Inventors: Hannu Sarén, Vaasa (FI); Kimmo Rauma, Vaasa (FI); Juha-Pekka Ström, Lappeenranta (FI); Magnus Hortans, Vaasa (FI)

(73) Assignee: Vacon Oyj, Vaasa (FI)

( * ) Notice: Subject to any disclaimer, the term of this patent is extended or adjusted under 35 U.S.C. 154(b) by 1092 days.

(21) Appl. No.: 12/153,860

(22) Filed: May 27, 2008

(65) Prior Publication Data
US 2008/0316780 A1    Dec. 25, 2008

(30) Foreign Application Priority Data
Jun. 20, 2007   (FI) .................................. 20070493

(51) Int. Cl.
*H02M 5/452* (2006.01)
*H02M 1/12* (2006.01)
(52) U.S. Cl. .......................................... 363/98; 363/46
(58) Field of Classification Search .................. 363/40, 363/41, 46, 58, 98, 131, 132
See application file for complete search history.

(56) References Cited

U.S. PATENT DOCUMENTS

| | | | |
|---|---|---|---|
| 4,067,057 A * | 1/1978 | Taddeo et al. ................. | 363/41 |
| 4,605,999 A * | 8/1986 | Bowman et al. ............... | 363/19 |
| 5,231,343 A * | 7/1993 | Nakamura ..................... | 318/696 |
| 6,316,895 B1 * | 11/2001 | Ramarathnam ............. | 318/400.02 |
| 6,541,933 B1 | 4/2003 | Leggate et al. | |
| 6,603,675 B1 * | 8/2003 | Norrga ........................... | 363/132 |
| 7,164,254 B2 * | 1/2007 | Kerkman et al. ............. | 318/812 |
| 2005/0207194 A1 | 9/2005 | Baudesson et al. | |

FOREIGN PATENT DOCUMENTS
GB   2297208 A   7/1996

OTHER PUBLICATIONS

Oregon Micro Systems, Inc., User's Manual Step Motor Drivers MD10A, MH10 and MD125, Section 3.7, Step Pulse, p. 18, Copyright 1993, www.pro-ex.com/media/45653/drivers.pdf.*

* cited by examiner

*Primary Examiner* — Jessica Han
*Assistant Examiner* — Henry Lee, III
(74) *Attorney, Agent, or Firm* — Birch, Stewart, Kolasch & Birch, LLP

(57) ABSTRACT

The shape of the rising and falling edges of AC output voltage pulses of a PWM frequency converter is controlled by reducing a speed of change, and a height, of the AC output voltage pulse. The PWM frequency converter rectifies the alternating voltage of a supply network into a DC voltage which is filtered. A load bridge having power semiconductor phase switches forms an AC output voltage from the DC voltage for controlling the load. An average speed of voltage change of AC output voltage pulses is set using a phase switch to control at least one power component to be conductive and non-conductive in turn for a period of at least about one microsecond to change a pulse edge of the AC output voltage pulses into at least one micropulse, the width of which is controlled to increase towards a final state of the phase switch.

20 Claims, 4 Drawing Sheets

FREQUENCY CONVERTER VOLTAGE PULSE SHAPING DEVICE AND METHOD

BACKGROUND OF THE INVENTION

1. Field of the Invention

The object of this invention is an arrangement for controlling the output voltage pulses formed by a PWM frequency converter and more particularly the rising and falling edges of them.

2. Description of the Related Art

Figure 1:
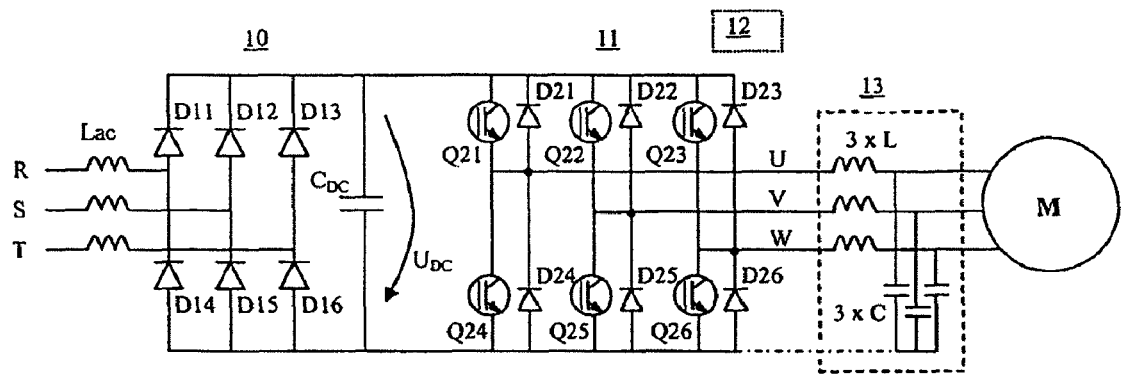

As is known in prior art a frequency converter forms output voltage of variable magnitude and variable frequency, which corresponds to the desired operating point of the motor connected to it, from a fixed-frequency supply voltage. The so-called PWM frequency converter has become established as the most general frequency converter type, in which the voltage of the supply network is initially rectified and filtered into the constant magnitude DC voltage of the intermediate circuit, from which the desired output voltage is then formed with fast power semiconductor switches (FIG. 1). The output voltage comprises pulses of the size of the constant DC voltage, the number and width of which are controlled so that the amplitude and frequency of the fundamental wave of the output voltage are those desired (PWM=Pulse Width Modulation).

In order to minimize the losses of the power semiconductor switches, they are generally controlled such that the on-controls and the off-controls occur as quickly as possible. In practice this means that the steepness of the rising edges and the falling edges of the output voltage pulses, i.e. the speed of change in the voltage dv/dt, is very large and dependent on the individually specific properties of the power semiconductor used.

As is known in prior art, a large speed of change in the voltage pulse has negative effects on the winding of the motor with both a short and a long motor cable:

1) The shorter the duration of the rising edge of voltage is, the higher is the proportion of the stress of the voltage step exerted on the first coil of the winding (see e.g. IEC's Technical Specification TS 60034-25, FIG. 12).

2) According to prior-art transmission line theory, a voltage pulse travels along a cable at a finite speed (approx. 50% of the speed of light), and a part of the pulses determined by the ratio of the wave impedances of the cable and of the motor are reflected back from the connection point. With a cable of the suitable length, owing to the reflection phenomenon the highest voltage pulse seen by the motor can be up to twice that of the voltage pulse sent by the frequency converter (see e.g. Transient Effects in Application of PWM Inverters to Induction Motors/Erik Persson/IEEE Transactions of Industry Applications, vol. 28 no 5, September/October 1992). The critical length of the cable, at the end of which the full-scale reflection occurs, depends on the time of duration of the rising edge of the voltage pulse; the faster the change is, the shorter the cable with which the full reflection occurs. For example the switching times of the IGBT transistors generally used as a power switch are of the order 0.1 μs, with which the critical cable length is approx. 30 m.

From the standpoint of the winding insulations of the motor, steep-edged and high voltage pulses are dangerous, as a result of which it is general to use filters implemented with passive components (inductance, capacitance, resistance) between the frequency converter and the motor, especially when supplying large voltages, in which the problem is at its worst. The general ones are e.g. dv/dt filters, with which the time of duration, and via that the critical cable length, is lengthened, and sine filters, with which the pulse-like voltage form is filtered to become almost sinusoidal for perfect elimination of the reflection problem. An example of a prior-art filter circuit is presented in FIG. 1 (without the damping resistors, which are used to prevent resonance oscillations of the filter). It is possible to influence with the magnitude of the inductance and capacitance values of the filter whether the filter operates as a dv/dt filter or as a sine filter.

A problem when using filters is their cost, size and weight. Especially sine filters are very large in size and expensive.

SUMMARY OF THE INVENTION

With the solution according to this invention the problems of prior art can be avoided by achieving a controlled speed of change in the rising edge of the output voltage pulse without large and expensive filters.

In the invention the rising and falling edges of the output voltage pulses formed by the PWM frequency converter are shaped, preferably to reduce the speed of change of the voltage pulses and the height of the voltage step. This kind of rounding of the voltage pulses correspondingly also affects the voltage pulses seen at the poles of the motor, which in turn reduces the stress exerted on the winding insulations of the motor and through that lengthens the lifetime of the motor.

The solution is based on the fact that at on the edge of the voltage pulse, instead of the power switch being controlled in the conventional manner to be conductive in one stroke, it is controlled to be conductive and non-conductive in turns for a period of a few μs. That being the case the simple pulse edge changes into at least one, preferably numerous, so-called micropulses, the width of which is controlled to increase towards the final state of the switch.

In addition the solution according to the invention can comprise a small filter containing passive components with which the voltage of the micropulses is filtered into the final output voltage of the frequency converter, the speed of change of which can be controlled with the desired method almost steplessly by controlling the number of micropulses and the pulse width. In order to minimize losses the filter solution can include a circuit, with which a large part of the switching energy can be fed back to the intermediate circuit of the frequency converter.

The characteristic features of the invention are described in detail in the independent claims and preferred embodiments in the other claims.

The control according to the invention requires very fast power switches, which are e.g. of the power FETS type (power field-effect transistors) and IGBT transistors and diodes implemented with so-called silicon carbide (SiC) technology.

Compared to prior-art solutions the solution according to the invention reduces the costs, the size and the weight of the appliance when it is preferable to limit the steepness and/or the height of the voltage pulses seen by the motor. The components of the passive filter required by the invention are very small compared to conventional filters. Additionally the implementation according to the invention enables the setting of the speed of change of an output voltage pulse to be that desired on a case-by-case basis, simply by software program via the number and widths of the micropulses, without an effect on the component values of the external passive filter.

SHORT DESCRIPTION OF THE DRAWINGS

Figure 2:
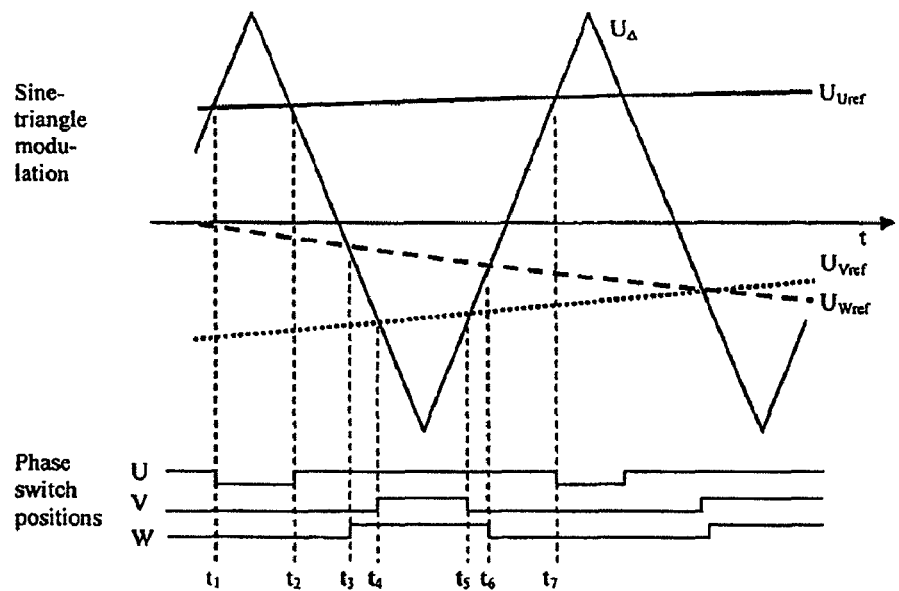
Figure 3:
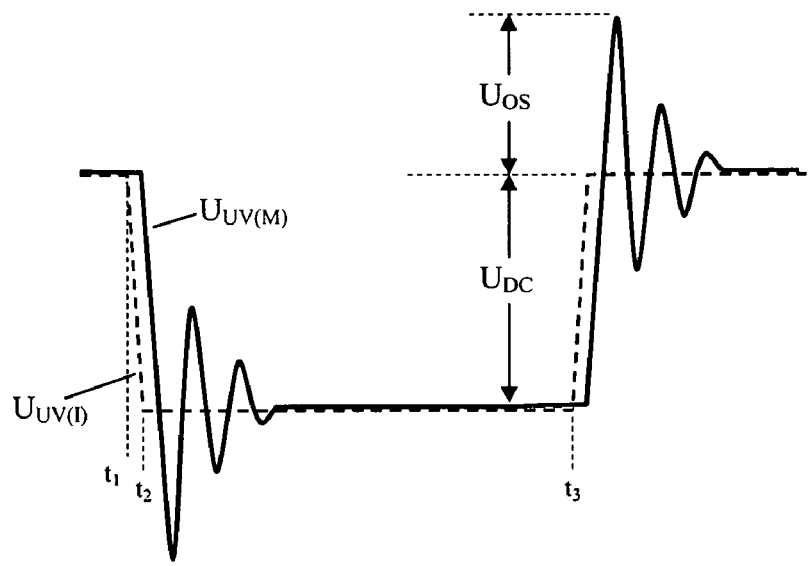
Figure 4:
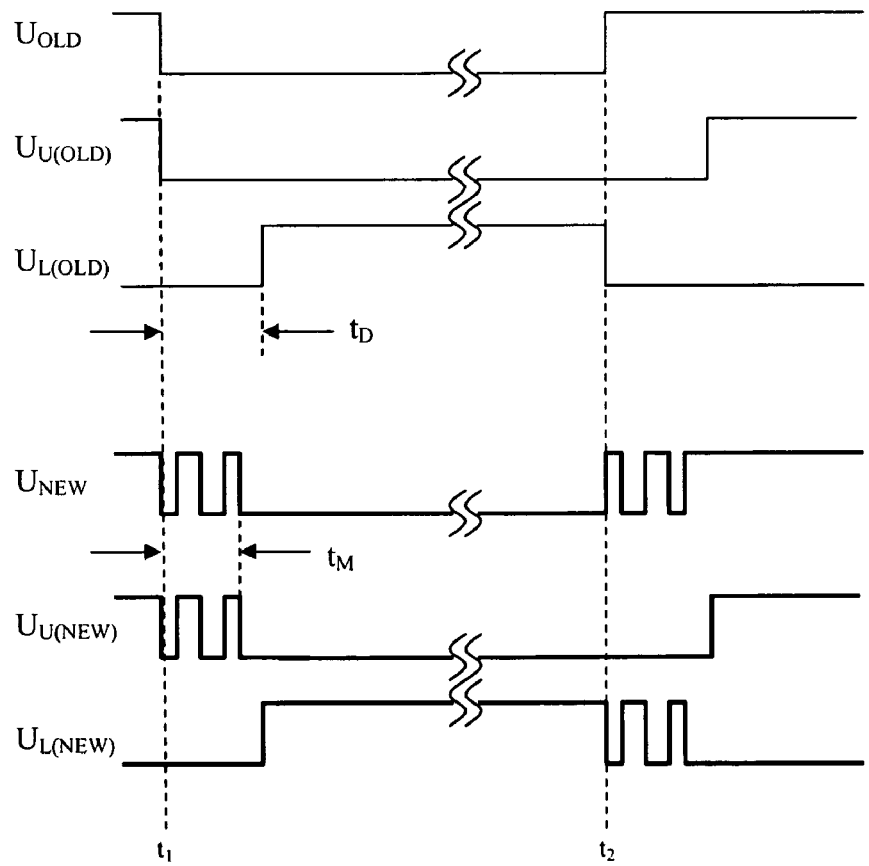
Figure 5A:
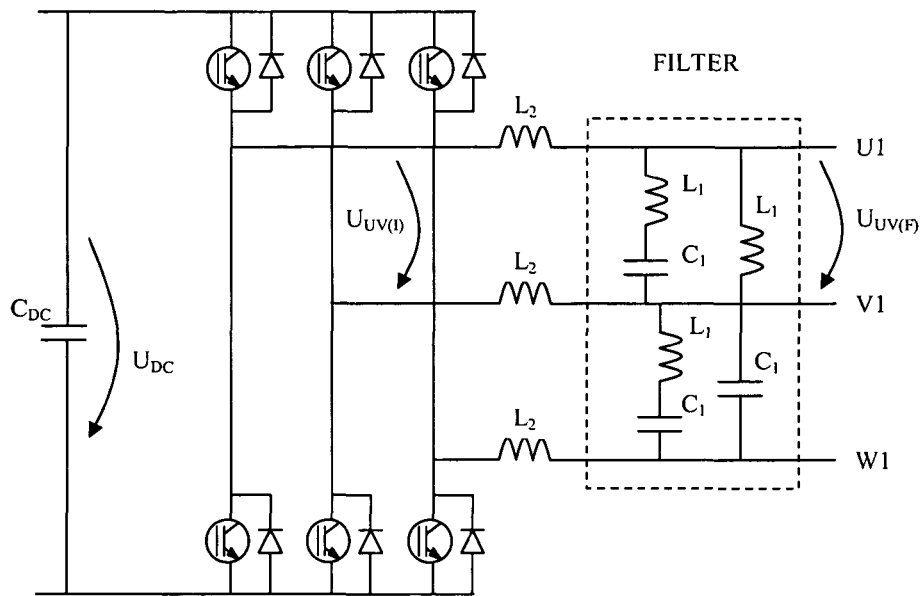
Figure 5B:
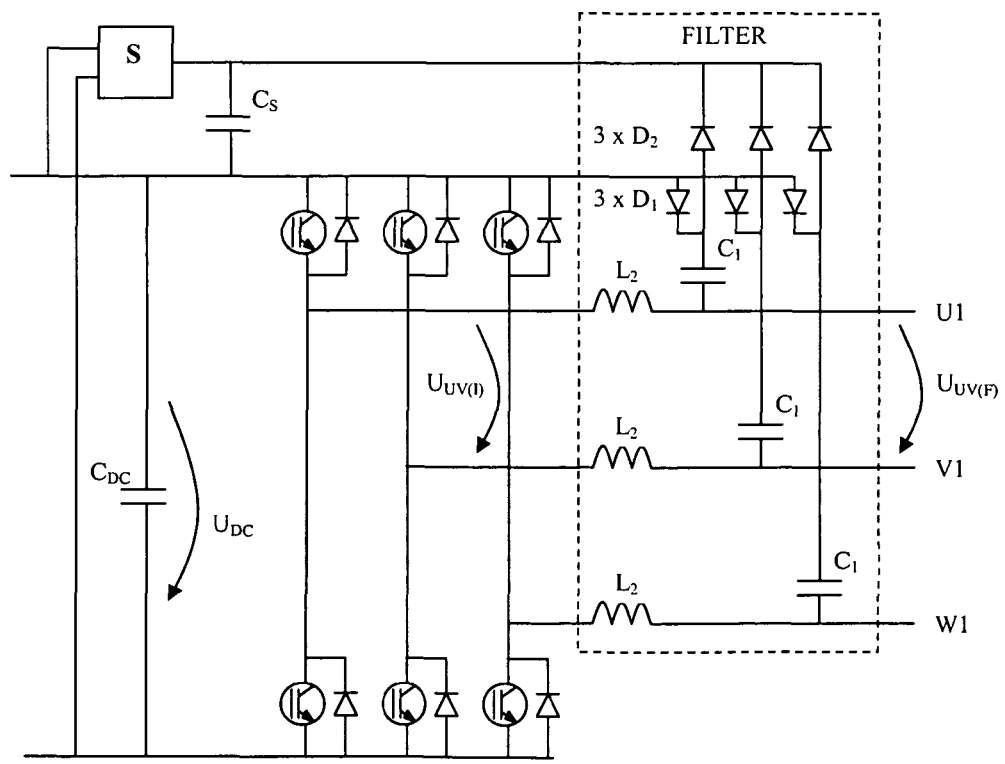

In the following, the invention will be described in more detail by the aid of some embodiments with reference to the attached drawings, wherein FIG. 1 presents the main circuit and filter of a frequency converter, FIG. 2 presents the modulation of a frequency converter FIG. 3 presents the voltage pulses in the output connectors of the frequency converter and in the input connectors of the motor, FIG. 4 presents the pulse forms of the output voltage with the conventional and with the new control method, FIG. 5a presents a filter solution according to the invention, FIG. 5b presents another filter solution according to the invention.

Figure 6:
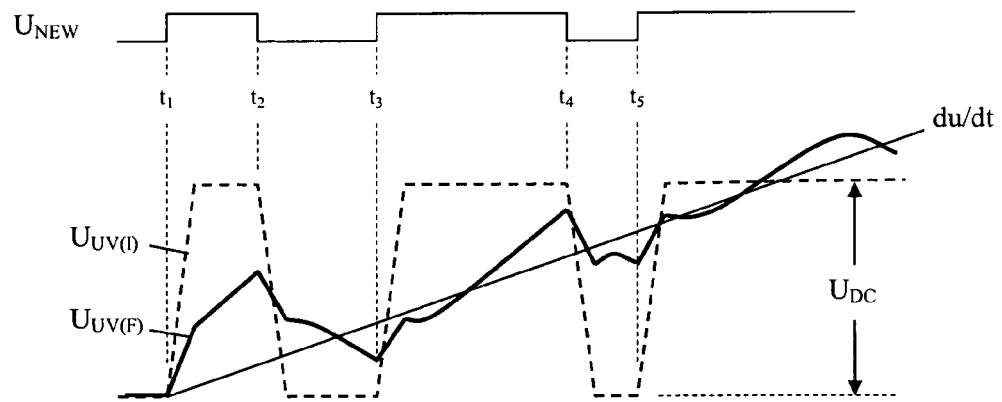

FIG. 6 presents the filtering of a pulse edge of the output voltage, and

Figure 7:
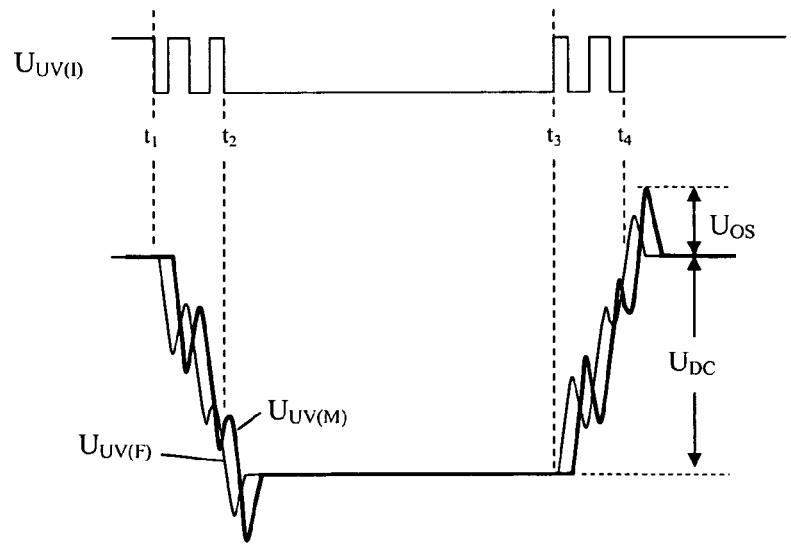

FIG. 7 presents the edges of a voltage pulse in the output connectors of the frequency converter and in the input connectors of the motor with the solution according to the invention.

DETAILED DESCRIPTION OF THE INVENTION

FIG. 1 presents an example of the main circuit of a normal three-phase PWM frequency converter, in which is a three-phase supply voltage R, S, T, an AC choke Lac for limiting the harmonics of the mains current, a network bridge 10 comprised of diodes D11-D16 for rectifying the three-phase alternating voltage of the supply network into the DC voltage $U_{DC}$ of the DC intermediate circuit which is filtered with a filtering capacitor $C_{DC}$, a load bridge 11 comprised of three phase switches implemented with power semiconductor components, which forms the three-phase output voltage U, V, W from the DC voltage of the intermediate circuit for controlling the motor M, and a control unit 12. In modern frequency converters the phase switches are generally implemented with the IGBT transistors Q21-Q26 in accordance with the embodiment of the figure, in parallel with which so-called zero diodes D21-D26 are connected. A phase switch means the components with control circuit needed for controlling one output phase, e.g. the U phase switch comprising Q21, Q24, D21 and D24. In addition a filter 13 is drawn in the figure, which comprises at least the phase-specific inductances L and capacitances C, as well as e.g. damping resistors connected in parallel with the inductances, which are not however drawn in the figure. With the dimensioning of the inductance values and capacitance values it is possible to influence whether it is a dv/dt filter (smaller component values) or a sine filter (larger component values) that is in question. The capacitors C can be in a delta connection or in a star connection (in accordance with the figure). The star point of the star connection can be connected e.g. to the second pole of the DC intermediate circuit in the manner presented with dot-and-dash line in the figure or it can be left unconnected.

The control pulse forms of the switches of the load bridge are formed in the so-called modulator of the control unit. FIG. 2 contains an example of a prior-art modulator type, a sine-wave modulator. In it the phase-specific sine waves $U_{Uref}$, $U_{Vref}$, $U_{Wref}$ are compared to the common saw-tooth wave $U_\Delta$ and phase-specific switch controls are received as the result, in which e.g. the upper position of the signal U corresponds to the power switch of the upper branch of the phase switch U being controlled to conduct and the lower position to the power switch of the lower branch of the phase switch U being controlled to conduct. The signal frequency of the switch controls is called the switching frequency, which in modern frequency converters implemented with IGBT transistors typically ranges between 1 . . . 16 kHz.

FIG. 3 presents what kind of effect the reflection phenomenon has on the voltage of the motor without a filter. $U_{UV(I)}$ presents the theoretical waveform of the voltage between the U and the V phases in the output connectors of the frequency converter, and correspondingly $U_{UV(M)}$ the voltage of the same phases at the other end of the cable in the connection point of the motor. In the figure the output voltage of the frequency converter changes between the times $t_1$ and $t_2$ by the extent of the size of a step of the intermediate circuit voltage $U_{DC}$. A corresponding voltage change occurs at the motor end later by the extent of the propagation delay of the cable. Owing to the reflection phenomenon the maximum exceedance $U_{OS}$, which depends on the cable length as well as on the ratio of the wave impedances of the cable and the motor, occurs at the front edge of the voltage pulse. At the front edge of the voltage pulse the voltage oscillates at a frequency depending on the cable length, among other things, and the oscillation dampens little by little owing to the losses until the voltage of the motor finally levels out to be the same as the supply voltage in the output of the frequency converter.

FIG. 4 presents how the control of power semiconductors according to this invention differs from the conventional control. $U_{OLD}$ is the pulse form of the U phase produced by the modulator (compare FIG. 2), according to which the power switches of the top branch ($U_{U(OLD)}$) and the bottom branch ($U_{L(OLD)}$) of the U phase are directly controlled according to prior art. The control process of the switches also comprises as is known in prior art a so-called dead time $t_D$, during which neither switch is controlled.

$U_{NEW}$ is the pulse form according to the control method of this invention, in which extra switchings (micropulses) at the time interval $t_M$ according to the figure are added to the points of change of the pulse form produced by the modulator, the length of which time interval can change according to what kind of speed of change is desired in the output voltage. The pulse ratio of the additional switchings, when there are many, is preferably fitted to change e.g. linearly towards the final state (e.g. immediately after the time $t_1$ the control signal $U_{U(NEW)}$ is in the "1" position most of the time, while in the final stage of the time delay $t_M$ in the final phase is in the "0" position most of the time). The micropulses are used only in the control of that power switch which has an effect on the status of the output voltage. For example, if in the situation of FIG. 4 at the time $t_1$ the output current of the U phase travels towards the motor, micropulses are only used in the control of the power switch of the upper branch (because in the lower branch the current travels via the zero diode in which case the control of the power switch in parallel with the diode does not have any effect on the state of the output voltage). Correspondingly if the current of the U phase at the time $t_2$ travels towards the frequency converter, micropulses are only used in the control of the power switch of the lower branch. Using micropulses increases the switching frequency of the power switches and the losses caused by it, for which reason the use of pulses is possible in practice only with very fast power switches. The duration in time of an individual micropulse is short, typically less than 1 μs.

FIG. 5a presents a possibility for implementing the filter FILTER used in connection with the invention (any damping resistors possibly needed have been omitted from the figure for the sake of simplicity). The phase-specific chokes $L_2$ are also drawn in the figure, which represent all the kind of stray inductances resulting from the mechanical implementation of the power stage, which are significant from the standpoint of the filter (e.g. the internal part of the output cabling of the frequency converter). $L_2$ can also be a separate component if the inductance value of the filter requires it. During the micropulses the capacitors $C_1$ of the filter gradually charge towards the final voltage with the chokes $L_1$ and $L_2$ limiting the magnitude of the charging current pulses. Only short current pulses travel through the chokes $L_1$ during the micropulses, so their dimensioning can be considerably lighter than e.g. in the filter according to FIG. 1, in which the full motor current travels via the chokes.

FIG. 5b presents a second possibility for implementing the filter FILTER used in connection with the invention. The filter circuit is based on the idea according to which the energy tied to the passive components (L2, C1) in switching situations is led by means of the diode switch (D1, D2) to the energy storage capacitor $C_S$, from where it can be transferred onwards by means of the chopper circuit S back to the filtering capacitor $C_{DC}$ of the intermediate circuit. The power losses arising in the filter can be significantly reduced by means of the circuit. Recovery of the switching energy does not in itself have an effect on the filtering of the output voltage, so during the micropulses with the connection according to FIG. 5b the same kind of effect is achieved on the output voltage as e.g. with the filter according to FIG. 5a.

FIG. 6 presents an example of the formation of the output voltage when two micropulses are used with the filter arrangement according to FIG. 1, 5a or 5b. The filtered output voltage $U_{UV(F)}$ increases towards its final value according to how the widths of the micropulses of the voltage $U_{UV(I)}$ formed by the power switch of the frequency converter increase. With the filter solution according to FIG. 5a, which the figure presents, the step-like effect of the voltage distribution determined by the inductance values of $L_1$ and $L_2$ at the switching moments is seen in the output voltage (which step is missing when using the circuits according to FIGS. 1 and 5b). Since the filter is the LC type, the peak value of the output voltage is slightly higher than the voltage $U_{DC}$ of the intermediate circuit. The direct du/dt drawn in the figure presents the average speed of rise in the output voltage, which can be set to that desired via the control of the duration of the micropulses and of the pulse width. It should be noted that there can be only one micropulse, in which case its length is preferably fitted to be such that during the pulse the output voltage rises to over 50% of its final value.

FIG. 7 shows the theoretical waveforms of the voltage at the end of the cable on the frequency converter ($U_{UV(F)}$) and on the motor ($U_{UV(M)}$) side. Since the output voltage of the frequency converter rises to its full value gently in steps, and the reflection phenomenon increases by only the height of one voltage step at a time, the voltage peak seen by the motor remains lower than in the conventional situation according to FIG. 3.

It is obvious to the person skilled in the art that the different embodiments of the invention are not limited solely to the example described above, but that they may be varied within the scope of the claims presented below.

The invention claimed is:

1. A method for controlling the shape of the rising and falling edges of AC output voltage pulses of a PWM frequency converter by reducing a speed of change of, and a height of, the AC output voltage pulse, in which the PWM frequency converter is a network bridge for rectifying the alternating voltage of the supply network into a DC voltage ($U_{DC}$) of a DC intermediate circuit, which is filtered with a filtering capacitor ($C_{DC}$), a load bridge comprised of phase switches implemented with power semiconductor components, which forms an AC output voltage (U, V, W) from the DC voltage of the intermediate circuit for controlling the load (M), comprising setting an average speed of voltage change of the AC output voltage pulses of at least one power component by using one of said phase switch to control the at least one power component to be conductive and non-conductive in turn for a period of at least about one microsecond to change a pulse edge of the AC output voltage pulses into at least one micropulse, and wherein the width of the at least one micropulse is controlled to increase towards a final state of said phase switch.

2. The method according to claim 1, further comprising controlling the at least one power component by using the phase switch to be conductive and non-conductive in turn for a period of several microsecond to change a pulse edge of the AC output voltage pulses into a plurality of micropulses, and wherein the width of AC voltage pulse which has the plurality of said micropulses changes linearly towards a final stage of the phase switch.

3. Method according to claim 2, further comprising setting the number of micropulses and the period of time during which they are used.

4. Method according to claim 2, further comprising using only the number of micropulses to control power component which has an effect on the status of the AC output voltage.

5. An apparatus for controlling the shape of the rising and falling edges of AC output voltage pulses of a PWM frequency converter by reducing a speed of change of, and a height of, the AC output voltage pulses, in which the PWM frequency converter is a network bridge for rectifying an alternating voltage of a supply network into a DC voltage ($U_{DC}$) of a DC intermediate circuit, which is filtered with a filtering capacitor ($C_{DC}$), a load bridge comprised of phase switches implemented with power semiconductor components, which forms an AC output voltage (U, V, W) from the DC voltage of the intermediate circuit for controlling the load (M), and a control unit, comprising one of said phase switches for setting an average speed of voltage change of the AC output voltage pulses of at least one power component to control the at least one power component to be conductive and non-conductive in turn for a period of at least about one microsecond to change a pulse edge of the AC output voltage pulses into at least one micropulse, and wherein the width of the at least one micropulse is controlled to increase towards a final state of said phase switch.

6. The apparatus according to claim 5, wherein the phase switch is adapted to control the at least one power component to be conductive and non-conductive in turn for a period of about several microseconds to change a pulse edge of the AC output voltage pulses into a plurality of micropulses; and wherein the width of the AC voltage pulses which have the plurality of said micropulses changes linearly towards a final stage of the phase switch.

7. The apparatus according to claim 6, wherein the control unit is adapted to set the number of micropulses and the period of time during which they are used.

8. The apparatus according to claim 5, wherein the control unit is adapted to use the at least one micropulse only in the control of at least one power component which has an effect on the status of the output voltage.

9. The apparatus according to claim 5, further comprising a filter containing passive components for filtering voltages of the at least one micropulse into a final output voltage of the PWM frequency converter.

10. The apparatus according to claim 9,
further comprising a filter containing passive components for filtering a voltage of the at least one micropulse into a final output voltage of the PWM frequency converter, and
wherein the filter comprises a switch implemented with diodes ($D_1$, $D_2$), for leading switching energy of the filter to an energy-storing capacitor ($C_s$).

11. The apparatus according to claim 5,
wherein the at least one power component controlled by the phase switch comprises a power FET (power field-effect transistor).

12. The apparatus according to claim 5,
wherein the at least one power component controlled by the phase switch comprises an IGBT transistor with silicon carbide (SiC).

13. The apparatus according to claim 5,
wherein the phase switch has a zero diode which comprises silicon carbide (SiC).

14. The method according to claim 2,
further comprising setting a number of the plurality of micropulses and the period of time during which they are used.

15. The method according to claim 2,
further comprising using the plurality of micropulses only in the control of that at least one power component which has an effect on the status of the output voltage.

16. The method according to claim 3,
further comprising using the plurality of micropulses only in the control of a component which has an effect on the status of the output voltage.

17. The apparatus according to claim 6,
further comprising setting a number of micropulses and the period of time during which they are used.

18. The apparatus according to claim 6,
wherein the control unit is adapted to use the micropulses only in the control of that the at least one power component which has an effect on the status of the output voltage.

19. The apparatus according to claim 7,
wherein the control unit is adapted to use the micropulses only in the control of at least one power component which has an effect on the status of the output voltage.

20. The apparatus according to claim 6,
further comprising a filter containing passive components, for filtering voltages of the micropulses into final AC output voltage of the PWM frequency converter.

* * * * *